United States Patent [19]
Dawson et al.

[11] Patent Number: 5,453,262
[45] Date of Patent: * Sep. 26, 1995

[54] CONTINUOUS PROCESS FOR PRODUCTION OF CERAMIC POWDERS WITH CONTROLLED MORPHOLOGY

[75] Inventors: William J. Dawson, Dublin; Scott L. Swartz, Worthington, both of Ohio

[73] Assignee: Battelle Memorial Institute, Columbus, Ohio

[*] Notice: The portion of the term of this patent subsequent to May 12, 2009 has been disclaimed.

[21] Appl. No.: 896,773

[22] Filed: Jun. 10, 1992

Related U.S. Application Data

[60] Continuation-in-part of Ser. No. 727,039, Jul. 8, 1991, abandoned, which is a division of Ser. No. 295,166, Dec. 9, 1988, Pat. No. 5,112,433.

[51] Int. Cl.$^6$ .............................. C01G 1/02; C01G 23/04; C04B 35/46
[52] U.S. Cl. .................. 423/593; 423/594; 423/595; 423/598; 423/599; 252/62.9; 501/134; 501/135; 501/136; 501/137; 501/138; 501/139
[58] Field of Search .............. 252/62.9, 62.9 PZT; 501/134, 135, 136, 137, 138, 139; 423/593, 598, 594, 595, 599

[56] References Cited

U.S. PATENT DOCUMENTS

| | | | |
|---|---|---|---|
| 3,963,630 | 6/1976 | Yonezawa et al. | 252/62.9 |
| 4,677,083 | 6/1987 | Uedaira et al. | 501/137 |
| 4,829,033 | 5/1989 | Menashi et al. | 501/139 |
| 4,832,939 | 5/1989 | Menashi et al. | 423/598 |
| 4,863,883 | 9/1989 | Menashi et al. | 501/138 |
| 5,112,433 | 5/1992 | Dawson et al. | 501/134 |

FOREIGN PATENT DOCUMENTS

| | | | |
|---|---|---|---|
| 0150135 | 7/1985 | European Pat. Off. | 501/137 |
| 0237640 | 9/1987 | European Pat. Off. | 501/134 |
| 50-033209 | 3/1975 | Japan | 501/137 |
| 53-021797 | 2/1978 | Japan | 501/137 |
| 56-158401 | 12/1981 | Japan | 501/137 |
| 61-106456 | 5/1986 | Japan | 501/134 |
| 62-187116 | 8/1987 | Japan | 501/134 |
| 63-085014 | 4/1988 | Japan | 501/134 |
| 63-206316 | 8/1988 | Japan | 501/134 |
| 0427392 | 5/1974 | U.S.S.R. | 501/134 |

*Primary Examiner*—Anthony Green
*Attorney, Agent, or Firm*—Klaus H. Wiesmann

[57] ABSTRACT

A continuous process for making a crystalline ceramic powder having a perovskite structure, $ABO_3$, comprising:

a. preparing a first acidic aqueous solution containing one or more elements that are insoluble precursor elements capable of forming the perovskite structure;
b. preparing a second basic solution containing a sufficient concentration of hydroxide to precipitate the elements in step (a);
c. mixing the first acidic solution with the second basic solution to precipitate a substantially pure mixture of hydroxides;
d. washing the precipitate to remove hydroxide and salt impurities;
e. forming a slurry of oxides or hydroxides of one or more of the elements that are soluble precursor elements capable of forming in the perovskite structure, and heating the slurry to a temperature sufficient to dissolve the soluble oxides or hydroxides of the soluble precursor elements;
f. redispersing the washed precipitate and heating to the temperature of the soluble oxides or hydroxides of step (e);
g. mixing solubilized oxides or hydroxides of step (e) with the heated slurry of step (f);
h. prereacting the third aqueous slurry at temperature, pressure, concentration, and for a time necessary to obtain the desired powder morphology; and
i. hydrothermally treating the pre-reacted solution in a continuous reactor at an elevated temperature and pressure for a time sufficient to form the powder.

33 Claims, 7 Drawing Sheets

*Continuous process for production of barium titanate with controlled morphology*

CONTINUOUS PROCESS FOR PRODUCTION OF CERAMIC POWDERS WITH CONTROLLED MORPHOLOGY

This application is a continuation-in-part of application Ser. No. 07/727,039 filed on Jul. 8, 1991, abandoned, which is a division of application Ser. No. 07/295,166 filed on Dec. 9, 1988, now U.S. Pat. No. 5,112,433; the disclosures of which are incorporated by reference as if completely rewritten herein.

FIELD OF THE INVENTION

The present invention relates to a continuous process for making perovskite, $ABO_3$, ceramic powders. The powders may comprise single-crystal and or polycrystalline, solid solution particles, and may also contain other secondary ingredients, such as dopants and solid solution substitutions on the A and/or B sites, that alter electrical properties. The powders have utility in numerous electronic applications as, for example, dielectric ceramics, piezoelectric materials, electrostrictive ceramics, and transparent electro-optic ceramics.

BACKGROUND OF THE INVENTION

The present invention involves a process that can be used to produce oxide ceramic powders for various electronic or optical applications. Some of the most commercially important oxide ceramics have the perovskite structure. Perovskite compounds have the general formula $ABO_3$, where the A cation is relatively large and of low valence (such as $Ba^{2+}$, $Sr^{2+}$, $Ca^{2+}$, $Pb^{2+}$, $La^{3+}$, $Sm^{3+}$, $Nd^{3+}$, $Bi^{3+}$, $K^+$, etc) and the B cation is relatively small and of high valence (such as $Ti^{4+}$, $Zr^{4+}$, $Sn^{4+}$, $W^{6+}$, $Nb^{5+}$, $Ta^{5+}$, $Fe^{3+}$, $Mn^{3+}$, $Mg^{2+}$, $Zn^{2+}$, $Ni^{2+}$, etc.). Perovskite ceramics have numerous commercial applications, mainly because of their useful electronic properties. These applications include materials for dielectric ceramics for capacitors; piezoelectric materials for transducers and sensors; electrostrictive ceramics for micropositioners and actuator devices; and transparent electro-optic ceramics for information storage and optical signal processing. A good discussion of perovskite structure is given in the June, 1988 issue of Scientific American, PEROVSKITES, pages 74 to 81, in an article by Robert M. Hazen.

The perovskite structure as typified by $BaTiO_3$ above 135° C. has a cubic structure. This structure consists of a regular array of oxygen ions at the corners, small tetravalent titanium ions in the center, and large, divalent barium ions located at the face centers. In ferroelectric perovskite compounds, the perovskite structure is distorted at low temperatures, and exhibits tetragonal, orthorhombic, or rhombohedral symmetry. At higher temperatures, the structure transforms to cubic; this transition temperature from the distorted phase to the cubic phase is called the Curie point. Ferroelectric behavior is caused by distortions in the crystal lattice caused by shifts in the position of the central cation (i.e., the Ti ion in $BaTiO_3$); this results in a displacement of the centers of positive and negative charge of the ions within the structure and, thus, a net (or "spontaneous") polarization of the structure. The electrical properties are significantly affected by ferroelectricity in perovskites, giving rise to useful dielectric, piezoelectric, and electro-optic properties. The electrical properties of perovskites can be tailored to those required for a specific application by the wide range of compositional substitutions that are possible. The electrical properties of perovskite ceramics are also affected by manufacturing and processing conditions, as more fully described below.

The requirements of a powder for the numerous electric applications of perovskite ceramics depend on the specific material and its application. However, in most applications, the "ideal" powder is considered to have a fine particle size, narrow or no particle size distribution, chemical homogeneity, controlled stoichiometry, equiaxed particle shape, and to be agglomerate free. After a powder has been prepared, several processing steps are required to form the powder into a shape and to densify it into a finished functional electrical ceramic element. A powder is first formed or compacted into a partially dense shape called a green body. The exact shape depends on the electrical element's intended function and application, e.g., an electromechanical transducer or a multilayer ceramic capacitor. Once the powder is formed into a green body (e.g., by dry pressing or tape casting), the part must be densified by hot pressing, sintering, or the like. Sintering involves heating the green body to high temperature and allowing densification to occur by diffusional processes. The sintering conditions, e.g., time, temperature, pressure, and atmosphere, are dictated by the nature of the starting powder, the powder compaction, and the desired microstructure (e.g., grain size, microstructural uniformity and distribution of secondary phases) of the electrical ceramic elements. Some characteristics of the microstructure which can significantly affect the electrical properties of the ceramic element include grain size, and size distribution, amount and location of porosity, pore size and distribution, and controlled distribution of secondary phases. Sintering is a key aspect of the manufacturing process of ceramic elements and must be controllable to insure that the production of high quality ceramic materials is reproducible. However, reproducibility of the sintering process and the ceramic element is highly dependent on the reproducibility of the powder production.

DETAILED DESCRIPTION OF THE INVENTION

The process of the invention is for making perovskite, $ABO_3$, ceramic powders which consist of single-crystal and/or polycrystalline, solid solution particles, containing dopant oxides and solid solution substitutions useful in commercial applications. The primary crystallite size that can be obtained is less than 0.1 microns while the secondary particle size that can be obtained is less than 1.0 microns. Compounds included are those containing any or all of the A elements: barium, strontium, calcium, magnesium, lead, lanthanum, bismuth, cerium, neodymium, samarium and any or all of the B elements hafnium, zirconium, titanium, tantalum, niobium, uranium, iron, antimony, nickel, manganese, cobalt, tungsten, molybdenum, lithium, zinc, magnesium, and tin. These powders can be sintered at a temperature of 100° to 400° C. below the sintering temperature of standard ball-milled and calcined powders to ceramics exhibiting uniform microstructures and homogeneous chemical compositions. The powders are expected to result in electrical properties superior to those of traditional electronic ceramics.

The present invention describes the introduction of a prereaction step prior to the hydrothermal processing step which allows for production of controlled morphology powders. The term pre-reacting or pre-reaction means an intermediate reaction step where the desired particle morphology is controlled prior to the hydrothermal continuous reaction step. By employing a pre-reaction step as taught herein, the secondary particle size can be controlled and the time required for the hydrothermal reaction step can be greatly reduced. Since the hydrothermal reaction step must be performed under the vapor pressure of solution (which can extend to as high as 3500 psi ), a reduction in residence time significantly decreases the necessary reactor volume, and therefore, can reduce the capital cost.

The general process differs significantly from the previous state-of-the-art process technology. Specifically, the process involves the use of the pre-reaction step to agglomerate partially reacted crystallites to their ultimate particle size. Secondly, the use of a continuous reactor with short residence time provides high quality powders with particle sizes desired for manufacture of ceramic components. Ultimate particle size can be controlled in the range from about 0.1 microns to about 1.0 microns, depending on reaction conditions such as temperature, time, and concentration.

Powders for electronic applications must meet the following specifications: (1) Controlled particle size and surface area; (2) high purity; (3) high reactivity toward sintering; and (4) controlled chemical composition. The method described herein achieves these goals.

Compounds of particular interest that can be produced by this method include (1) those in the family of lead zirconate titanate (PZT); (2) those in the family of lead titanate (PT); (3) those in the family of lead lanthanum zirconium titanate (PLZT); (4) those in the family of barium titanate (BT); (5) those in the family of lead magnesium niobate (PMN); (6) those in the family of lead zinc niobate (PZN); (7) those in the family of strontium titanate (SrTiO3); and those in the family of calcium titanate (CaTiO3).

Specific compositions with regard to PZT include the perovskite compound $Pb(Zr,Ti)O_3$, wherein the total dopant and solid substitution level ranges from 0 to 50 mole percent. Substitution elements can include lanthanum, calcium, strontium, barium, samarium, neodinium, tungsten, nickel, cobalt, iron, manganese, tin, niobium, tantalum and the like.

Specific compositions with regard to PT include the perovskite compound of $PbTiO_3$, with the Pb and Ti partially substituted by zero, one or more of the elements: calcium, samarium, neodymium, lanthanum, barium, strontium, tungsten, nickel, cobalt, iron, manganese, tin, zirconium, niobium, tantalum, and the like.

Specific compositions with regard to PLZT include the compound $Pb_{1-x} La_x Zr_{1-y} Ti_y O_3$ wherein the values of x range from 0 to 0.20 and the values of y range from 0.00 to 1.00.

Specific compositions with regard to BT include the composition $BaTiO_3$, wherein the barium and titanium are partially substituted by zero, one or more elements from the group consisting of calcium, strontium, lead, tin, magnesium, nickel, zinc, cobalt, niobium, tantalum, zirconium, neodymium, samarium, bismuth, lanthanum, and the like.

Specific compositions with regard to PMN include the composition $PbMg_{1/3}Nb_{2/3}O_3$, wherein the lead, magnesium and niobium are partially substituted by zero, one or more elements from the group consisting of nickel, iron, manganese, zinc, tantalum, tungsten, tin, titanium, zirconium, strontium, calcium, barium, lanthanum, and the like.

Specific compositions with regard to PZN include the composition $PbZn_{1/3}Nb_{2/3}O_3$, wherein the lead, zinc, and niobium and partially substituted by zero, one or more elements from the group consisting of nickel, iron, manganese, magnesium, tantalum, tungsten, tin, titanium, zirconium, strontium, calcium, barium, lanthanum, and the like.

The method is also applicable to other commercially important perovskite compounds.

Specific applications include: (1) piezoelectric ceramic transducer elements made from PZT and PT powders; (2) multilayer ceramic capacitors from BT, PMN, and PZN powders; (3) grain boundary layer capacitors made from BT or ST powders (4) electro-optic ceramic devices from PLZT and PMN powders; (5) PTCR ceramic devices from BT powders; and (6) electrostrictive ceramic actuator devices from PMN and PZN powders.

The major steps in the general continuous process for producing extremely small powders below about 0.1 micron include:

(1) Preparing a first acidic aqueous solution containing one or more elements that are insoluble precursor elements (i.e. their oxides or hydroxides are insoluble in aqueous solutions) capable of forming the perovskite structure.

(2) Preparing a second basic aqueous solution containing a sufficient concentration of hydroxide to form a precipitate comprising the elements in step (a).

(3) Mixing the first acidic solution with the second basic solution to precipitate a substantially pure mixture of hydroxides.

(4) Washing the precipitate to remove hydroxide and salt impurities.

(5) Forming a slurry of oxides or hydroxides of one or more of the elements that are soluble precursor elements (i.e. their oxides or hydroxides are soluble in aqueous solutions) capable of forming in the perovskite structure, and heating the slurry to a temperature sufficient to dissolve the soluble oxides or hydroxides of the soluble precursor elements. For barium titanate compounds the preferred temperature is about 50° C. to about 70° C.

(6) Redispersing the washed precipitate and heating to the temperature of the soluble oxides or hydroxides of step (5);

(7) Mixing solubilized oxides or hydroxides of step (5) with the heated slurry of step (6);

(8) Hydrothermally treating the slurry in a continuous reactor at an elevated temperature and pressure for a time sufficient to form the powder with perovskite structure. The continuous hydrothermal reactor, can be either a pipe continuous reactor or a continuous stirred tank reactor, and is heated to a temperature between about 100° C. and about 350° C., and a pressure of about 100 psi to 3500 psi, depending on the target composition, under the vapor pressure of the solution or in the presence of an oxidizing gas for less than 30 minutes. Barium titanates are preferably heated to a temperature between about 2100° C. and about 240° C., and a pressure of about 150 psi to 600 psi, depending on the target composition.

(8) Finally, the powder is cooled, separated, washed, and dried.

The major steps for obtaining fine particle size powders below 0.1 micron for the continuous process in an embodiment adapted to the process of U.S. Pat. No. 5,112,433 are:

(1) Acidic salts including chlorides, oxychlorides, and/or nitrates are dissolved in an acid/water solution to form an acidic solution of any or all of the following: hafnium, zirconium, titanium, niobium, tantalum, uranium, iron, antimony, lanthanum, bismuth, thorium, indium, nickel, manganese, neodymium, samarium, cobalt, tungsten, and tin, vanadium, dysprosium, praseodymium, yttrium, promethium, europium, cerium, ytterbium, lutetium, scandium, gadolinium, terbium, holmium, erbium, thulium, chromium, potassium, lithium, wherein the elements are in the proper ratio to obtain the desired stoichiometry of the final composition.

(2) The dissolved salt solution is added slowly to a vigorously mixed, basic solution containing a predetermined concentration of one, all or any of the hydroxides of sodium, ammonium and potassium until a pH value between 4 and 12 is reached. The precise pH value is dependent on the constituents dissolved in step (1) and on the desired particle size. For lead containing compounds, for example, the pH must be below 7.5 in order to obtain nearly complete reaction of lead oxide in step (6). For strontium and barium containing compounds, the pH must be greater than 6.5 to achieve nearly complete incorporation of these components. The pH value of the mixed hydroxide slurry also affects, to a lesser extent, the incorporation levels of antimony and tin. Manganese, chromium, nickel, and zinc are expected to be likewise affected. This method of precipitation results in the formation of a mixed hydroxide precipitate containing all of the above mentioned metal hydroxides in a homogeneous mixture. Ammonia (or ammonium hydroxide) is not used when manganese, nickel, or cobalt are selected in step (1).

(3) The mixed metal hydroxide is separated from the resultant salt solution and is washed with purified water until the chloride, nitrate, and free hydroxide contents of the hydroxide gel are to a sufficiently low level to favor complete incorporation of all constituents into the oxide phase in step (6). For example, after three washes the specific conductivity of the wash filtrates are less than about 2 mmho.

(4a) The soluble oxides and hydroxides of elements-selected from the group consisting of barium, strontium, calcium, magnesium, lead, zinc, yttrium, manganese, cobalt, and/or nickel are heated to a temperature sufficient to dissolve the oxides or hydroxides. For barium titanate compounds the preferred temperature is about 50° C. to about 70° C.

(4b) The washed hydroxide gel is then redispersed in water and is vigorously mixed until a homogeneous slurry with a pH of between 10.0 and 13.0 is formed and is heated to the temperature of the soluble elements of step (4a). oxides and/or hydroxides of the following: barium, strontium, calcium, magnesium, lead, manganese, cobalt, zinc, yttrium, and nickel in the proper ratio to produce a mixture with a stoichiometry equal to the desired $ABO_3$ stoichiometry of the target perovskite composition, (4c) The dissolved soluble compounds of step (4a) and the heated slurry of step (4b) are mixed.

(5) The mixed and heated slurry of step (4) is pre-reacted at a temperature, pressure, concentration, and for a time sufficient to produce a selected powder morphology. For barium titanate compounds the preferred temperature is about 80° C. to about 90° C.

(6) The pre-reacted slurry is hydrothermally treated. It is introduced into a continuous pressure reactor, which can be either a pipe continuous reactor or a continuous stirred tank reactor, and is heated to a temperature between 210° and 240° C., and a pressure of 150 to 600 psi, depending on the composition of the target composition, under the vapor pressure of the solution or in the presence of an oxidizing gas for less than 30 minutes. Barium titanates are preferably heated to a temperature between about 210° C. and about 240° C., and a pressure of about 150 psi to 600 psi, depending on the target composition.

(7) The crystalline solids formed in the reaction are separated from the liquid phase which is essentially free of soluble oxide components and is washed to remove any remaining ionic impurities. Finally the washed solids are dried. The solids have essentially the same metal ion stoichiometry as the feed material for the process.

The major steps in the general process for controlling powder morphology include:

(1) Preparing a first acidic aqueous solution containing one or more elements that are insoluble precursor elements capable of forming the perovskite structure.

(2) Preparing a second basic aqueous solution containing a sufficient concentration of hydroxide to form a precipitate comprising the elements in step (a).

(3) Mixing the first acidic solution with the second basic solution to precipitate a substantially pure mixture of hydroxides.

(4) Washing the precipitate to remove hydroxide and salt impurities.

(5) Mixing and heating a third aqueous slurry of the washed precipitate and adding oxides or hydroxides of one or more of the elements that are soluble precursor elements capable of forming the perovskite structure, where the slurry is heated to a temperature sufficient to dissolve the soluble oxides or hydroxides of the soluble precursor elements. For barium titanate compounds the preferred temperature is about 50° C. to about 700° C.

(6) Pre-reacting the third aqueous slurry at temperature, pressure, concentration, and for a time necessary to obtain the desired powder morphology. For barium titanate compounds the preferred temperature is about 80° C. to about 90° C.

(7) Hydrothermally treating the pre-reacted solution in a continuous reactor at an elevated temperature and pressure for a time sufficient to form the powder. The continuous hydrothermal reactor, can be either a pipe continuous reactor or a continuous stirred tank reactor, and is heated to a temperature between about 100° C. and about 240° C., and a pressure of about 100 psi to 3500 psi, depending on the target composition, under the vapor pressure of the solution or in the presence of an oxidizing gas for less than 30 minutes. Barium titanates are preferably heated to a temperature between about 210° C. and about 240° C., and a pressure of about 150 psi to 600 psi, depending on the target composition.

(8) Finally, the powder is cooled, separated, washed, and dried.

Typical acid solutions useful in the above processes are acidic salts including chlorides, oxychlorides, and/or nitrates dissolved in an acid/water solution to form an acidic solution of any or all of the following: hafnium, zirconium, titanium, niobium, tantalum, uranium, iron, antimony, lanthanum, bismuth, thorium, indium, nickel, manganese, neodymium, samarium, cobalt, tungsten, and tin, vanadium, dysprosium, praseodymium, yttrium, promethium, europium, cerium, ytterbium, lutetium, scandium, gadolinium, terbium, holmium, erbium, thulium, chromium, potassium, and lithium.

Typical soluble precursor materials include the oxides or hydroxides of one or more of the elements selected from the group consisting of barium, strontium, calcium, magnesium, lead, zinc, yttrium, manganese, cobalt, and nickel.

Products which can be produced and improved by this method include: barium titanate powders including all or any of the dopant metal oxides listed above; lead zirconate titanate formulations with or without dopants, lead lanthanum zirconium titanate formulations (PLZT); lead titanate and lead titanate doped with any of the materials listed in steps (1) and (4); strontium titanate (ST); and other perovskite compounds containing any or all of the elements listed above in the proper stoichiometry.

Advantages obtained by this improved process include reduced reaction temperature and time and improved control over product stoichiometry and particle size. Advantages of the improved product powders are uniform, controlled fine particle size, improved sintering reactivity, improved chemical homogeneity, reduced reaction time at high temperatures and pressures, and controlled agglomeration. These advantages are expected to result in the manufacture of electronic ceramics with improved structural and electrical properties by processes which are less polluting, more reliable and therefore more economical.

The precipitation is preferably carried out in a blender or mixer which provides sufficient agitation to ensure a uniform solution composition throughout. The blending speed can be varied from 3000 to 6000 rpm. After the desired pH endpoint is reached, the hydroxide is separated from the solution by filtration or centrifugation.

After completing steps (1) to (3), the precipitated mixture is washed with purified water to remove ionic impurities. This is accomplished by blending the gel with a volume of distilled water equal to two-thirds the volume from which it is formed. Blending is continued for 10 to 20 minutes, and the gel is again separated from the wash liquid. This procedure can be repeated to remove additional salts. Three wash cycles are sufficient to remove essentially all of the leachable salts. Purified water includes distilled and deionized water.

The gel is then redispersed in water and the remaining components added to the mixture. These components can include oxides or hydroxides of barium, strontium, lead, magnesium and calcium. In general, these compounds are mildly basic and will increase the pH of the mixture to between 10 and 13, depending on the concentration.

The mixture is then heated to the pre-reaction temperature to produce an agglomerated particle slurry and introduced to a continuous hydrothermal reactor. As an alternative, the hydroxides or oxides of barium, strontium, lead, magnesium and calcium can be slurried with water and heated to the pre-reaction temperature before mixing with a preheated coprecipitated hydroxide slurry. The slurry is heated to the reaction temperature which can be as low as about 100° C. or as high as about 350° C., a pressure between about 100 psi and 3500 psi, for a maximum cycle time of from about 10 minutes to about 30 minutes and usually less than 15 minutes, depending on the composition of the perovskite being formed. The mixture quickly reaches the maximum selected temperature and pressure. The slurry is then cooled to below 100° C., and the product powder is separated from the liquid phase by centrifugation, filtration or settling.

Likewise, given the teachings of this invention it is expected that relationships can be determined for all other elements incorporated into the perovskite structure by an ordinary person skilled in the art. To do this, synthesis experiments need to be performed employing a variety of pre-reaction temperatures and slurry concentrations, as well as coprecipitation pH's. For example, barium titanate formulations can be produced with other dopant elements, including zinc, magnesium, nickel, bismuth, cobalt, tungsten, manganese, niobium, tantalum, samarium, and neodymium as minor substitution elements. The hydroxide gel should be pre-reacted as described herein. Synthesis experiments can then be carried out as a function of concentration, temperature, pressure, time and other reaction conditions. The relationships could then be determined by analyzing powder particle size and crystallite size.

The major steps for controlling powder morphology for the continuous process in an embodiment adapted to the process of U.S. Pat. No. 5,112,433 are:

(1) Acidic salts including chlorides, oxychlorides, and/or nitrates are dissolved in an acid/water solution to form an acidic solution of any or all of the following: hafnium, zirconium, titanium, niobium, tantalum, uranium, iron, antimony, lanthanum, bismuth, thorium, indium, nickel, manganese, neodymium, samarium, cobalt, tungsten, and tin, vanadium, dysprosium, praseodymium, yttrium, promethium, europium, cerium, ytterbium, lutetium, scandium, gadolinium, terbium, holmium, erbium, thulium, chromium, potassium, lithium, wherein the elements are in the proper ratio to obtain the desired stoichiometry of the final composition.

(2) The dissolved salt solution is added slowly to a vigorously mixed, basic solution containing a predetermined concentration of one, all or any of the hydroxides of sodium, ammonium and potassium until a pH value between 4 and 12 is reached. The precise pH value is dependent on the constituents dissolved in step (1) and on the desired particle size. For lead containing compounds, for example, the pH must be below 7.5 in order to obtain nearly complete reaction of lead oxide in step (6). For strontium and barium containing compounds, the pH must be greater than 6.5 to achieve nearly complete incorporation of these components. The pH value of the mixed hydroxide slurry also affects, to a lesser extent, the incorporation levels of antimony and tin. Manganese, chromium, nickel, and zinc are expected to be likewise affected. This method of precipitation results in the formation of a mixed hydroxide precipitate containing all of the above mentioned metal hydroxides in a homogeneous mixture. Ammonia (or ammonium hydroxide) is not used when manganese, nickel, or cobalt are selected in step (1).

(3) The mixed metal hydroxide is separated from the resultant salt solution and is washed with purified water until the chloride, nitrate, and free hydroxide contents of the hydroxide gel are to a sufficiently low level to favor complete incorporation of all constituents into the oxide phase in step (6). For example, after three washes the specific conductivity of the wash filtrates are less than about 2 mmho.

(4) The washed hydroxide gel is then redispersed in water and is vigorously mixed until a homogeneous slurry with a pH of between 10.0 and 13.0 is formed with the remaining perovskite components including oxides and/or hydroxides of the following: barium, strontium, calcium, magnesium, lead, manganese, cobalt, zinc, yttrium, and nickel in the proper ratio to produce a mixture with a stoichiometry equal to the desired $ABO_3$ stoichiometry of the target perovskite composition, and is heated to a temperature where the washed precipitate from step (3) does not convert to an oxide, yet sufficient to dissolve the selected elements of barium, strontium, calcium, magnesium, lead, zinc, yttrium, manganese, cobalt, and/or nickel. For barium titanate compounds the preferred temperature is about 50° C. to about 70° C.

(5) The mixed and heated slurry of step (4) is pre-reacted at a temperature, pressure, concentration, and for a time sufficient to produce a selected powder morphology. For barium titanate compounds the preferred temperature is about 80° C. to about 90° C.

(6) The pre-reacted slurry is hydrothermally treated. It is introduced into a continuous pressure reactor, which can be either a pipe continuous reactor or a continuous stirred tank reactor, and is heated to a temperature between 210° and 240° C., and a pressure of 150 to 600 psi, depending on the composition of the target composition, under the vapor pressure of the solution or in the presence of an oxidizing gas for less than 30 minutes. Barium titanates are preferably heated to a temperature between about 210° C. and about 240° C., and a pressure of about 150 psi to 600 psi, depending on the target composition.

(7) The crystalline solids formed in the reaction are separated from the liquid phase which is essentially free of soluble oxide components and is washed to remove any remaining ionic impurities. Finally the washed solids are dried. The solids have essentially the same metal ion stoichiometry as the feed material for the process.

Products which can be produced and improved by this method include: barium titanate powders or strontium titanate powders including all or any of the dopant metal oxides listed in steps (1) and (4) above; lead zirconate titanate formulations with or without dopants, lead lanthanum zirconium titanate formulations (PLZT); lead titanate and lead titanate doped with any of the materials listed in steps (1) and (4); and other perovskite compounds containing any or all of the elements listed in steps (1) and (4) in the proper stoichiometry.

Advantages obtained by this improved process include reduced reaction temperature and time and improved control over product stoichiometry and particle size. Advantages of the improved product powders are uniform, controlled fine particle size, improved sintering reactivity, improved chemical homogeneity, reduced reaction time at high temperatures and pressures, and controlled agglomeration. These advantages are expected to result in the manufacture of electronic ceramics with improved structural and electrical properties by processes which are less polluting, more reliable and therefore more economical.

The coprecipitation is preferably carried out in a blender or mixer which provides sufficient agitation to ensure a uniform solution composition throughout. The blending speed can be varied from 3000 to 6000 rpm. As an alternative, the sodium hydroxide or potassium hydroxide solution can be added to the acidic solution to cause the coprecipitation. This, however, may result in products which do not sinter as readily. This is presumably due to the creation of inhomogeneities in the precursor hydroxide gel. As the basic solution is added, the least soluble hydroxide will precipitate first, followed by the next least soluble and so on. The result is a mixture of several separate hydroxide components in the precursor gel. On the other hand, if the acidic solution, containing all of the coprecipitation components, is added to the basic solution, an atomically-mixed hydroxide is formed. This is caused by the instantaneous precipitation of the mixture as it comes in contact with the basic solution.

After the desired pH endpoint is reached, the hydroxide is separated from the solution by filtration or centrifugation.

After completing steps (1) and (2), the precipitated mixture is washed with purified water to remove ionic impurities. This is accomplished by blending the gel with a volume of distilled water equal to two-thirds the volume from which it is formed. Blending is continued for 10 to 20 minutes, and the gel is again separated from the wash liquid. This procedure can be repeated to remove additional salts. Three wash cycles are sufficient to remove essentially all of the leachable salts. Purified water includes distilled and deionized water.

The gel is then redispersed in water and the remaining components added to the mixture. These components can include oxides or hydroxides of barium, strontium, lead, magnesium and calcium. In general, these compounds are mildly basic and will increase the pH of the mixture to between 10 and 13, depending on the concentration.

The mixture is then heated to the pre-reaction temperature to produce an agglomerated particle slurry and introduced to a continuous hydrothermal reactor. As an alternative, the hydroxides or oxides of barium, strontium, lead, magnesium and calcium can be slurried with water and heated to the pre-reaction temperature before mixing with a preheated coprecipitated hydroxide slurry. The slurry is heated to the reaction temperature which can be as low as about 100° C. or as high as about 350° C., a pressure between about 100 psi and 3500 psi, for a maximum cycle time of from about 10 minutes to about 30 minutes and usually less than 15 minutes, depending on the composition of the perovskite being formed. The mixture quickly reaches the maximum selected temperature and pressure. The slurry is then cooled to below 100° C., and the product powder is separated from the liquid phase by centrifugation, filtration or settling.

Likewise, given the teachings of this invention it is expected that relationships can be determined for all other elements incorporated into the perovskite structure by an ordinary person skilled in the art. To do this, synthesis experiments need to be performed employing a variety of pre-reaction temperatures and slurry concentrations, as well as coprecipitation pH's. For example, barium titanate formulations can be produced with other dopant elements, including zinc, magnesium, nickel, bismuth, cobalt, tungsten, manganese, niobium, tantalum, samarium, and neodymium as minor substitution elements. The hydroxide gel should be pre-reacted as described herein. Synthesis experiments can then be carried out as a function of concentration, temperature, pressure, time and other reaction conditions. The relationships could then be determined by analyzing powder particle size and crystallite size.

The examples below illustrate the use of a pre-reaction step with the previously described process which allows for production of controlled morphology barium titanate-based powders. The method is also expected to be applicable to a wide range of other ceramic powders. By employing a pre-reaction step for barium titanates, it has been shown that the hydrothermal reaction step can be shortened to less than nine minutes.

EXAMPLE 1

Figure 1:
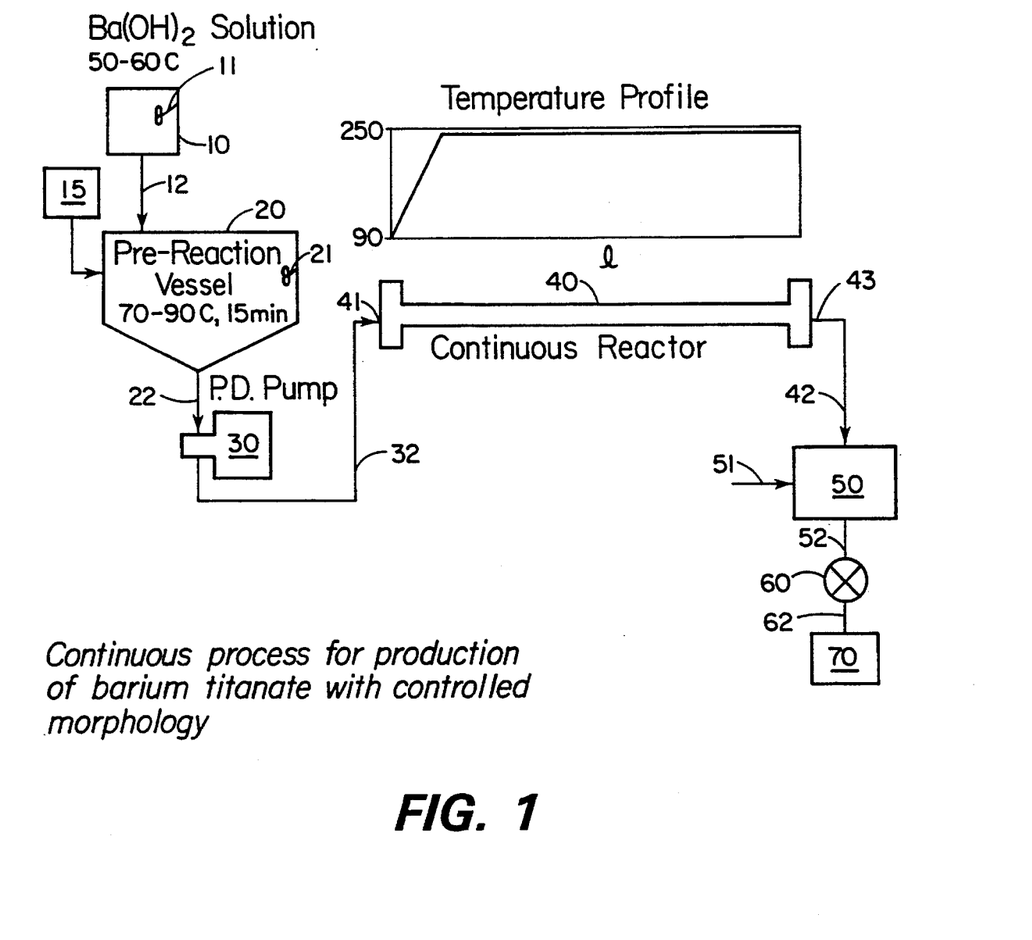
FIG. 1 is a schematic illustration of an embodiment of the continuous process of the invention for controlling the morphology of the perovskite powders.

A schematic diagram of apparatus that exemplifies the continuous process is shown in FIG. 1. This example illustrates the preparation of barium titanate; however, the method is applicable to a wide variety of materials as discussed above. Barium hydroxide, octohydrate is dissolved in water in a preheat vessel 10 at a temperature sufficient to help dissolve the material and mixed with stirrer 11. Titanium hydroxide or a mixture is prepared by precipitation from a chloride solution in a precipitation vessel 15 and is washed to remove salt (NaC1). The titanium hydroxide is added to water in a pre-reaction vessel 20 which is preferably operated at atmospheric pressure; but, can be operated at higher pressures where warranted for some of the other materials. The barium hydroxide solution is mixed and heated with the titanium hydroxide and is allowed to react at between 70° C. to 90° C., and preferably at 80° C. to 90° C., for several minutes to several hours (results to date show that the reaction time is shorter than 15 minutes and that a longer hold time of up to 56 hours has no effect on the outcome). The material from the prereaction tank 20 is then pumped with pump 30 and fed continuously to a pipe reactor 40 at a rate which gives a total residence time in the reactor of at least eight and at a temperature of greater than 200° C. In the present examples, the pipe reactor had a inner diameter of 5.08 cm (2 in.); diameters that provide for adequate heat transfer are preferred and can easily be determined by those skilled in the art. The time, temperature and pressure must be sufficient to convert the precursor materials to a crystalline perovskite. The product is collected in a let-down tank 50 which is controlled at a pressure exceeding the solution vapor pressure by a feed gas 51 which can be any inert gas such as nitrogen or air. The product is continuously bled out of the let-down tank 50 through a control valve 60 and is collected in another tank 70.

The product must then only be collected by filtration or settling, lightly washed to remove remaining salt, and can then be spray dried if required by the end-use process. Typically, powders for electronic applicators are spray dried in order to prepare agglomerated free-flowing powders ideal for molding operations.

It has been shown that the powder morphology can be controlled by controlling the concentration and temperature of the prereaction step. A temperature of 70° C. in the pre-reaction step is not sufficient to nucleate barium titanate seeds in a relatively short period (less than 2 hours). Therefore, the final product has an ultra-fine particle size on the order of 0.05 microns. At a pre-reaction temperature of 90° C., nucleation is also concentration dependent.

At a concentration (based on final product weight percent) of 4 to 5 weight percent, nucleation does not occur within a time frame of 2 to 4 hours and therefore, the product has a relatively fine particle size. However, at a concentration of 8 to 10 weight percent, nucleation does occur and a product is formed with a particle size of 10 times greater than that formed by the non-nucleated feed material. Once knowing the teachings herein, the concentration, temperature and other parameters required for nucleation in a given case can easily be determined by those skilled in the art.

The preferred embodiment of the process includes that shown in FIG. 1 where the pre-reaction is in one or more stirred batch reactors at less than 90° C. temperature and at about ambient pressure. The continuous portion is in a pipe configuration and the hydrothermal treatment is then at a pressure of about 150 to 600 psi at about 210° to 240° C. Another embodiment for the continuous portion of the process includes a continuous stirred tank reactor. While still a further embodiment for the continuous process includes a series of pressurized reactors in which at least the first reactor is a continuous stirred tank reactor.

EXAMPLE 2

The material for this example was barium titanate powder prepared with fine particle size by the continuous method but without the pre-reaction step. The example illustrates the fine particle sizes that are possible when the continuous method is used without the pre-reaction step. Details are shown in Table I below.

TABLE I

|  | Example No. | | | |
| --- | --- | --- | --- | --- |
|  | 2 | 3 | 4 | 5 |
| Feedstock Preparation | | | | |
| No. Gel Wash Cycles | 2.5 | 2 | 2 | 2 |
| Gel pH | 8.52 | 7.54 | 11.72 | 11.72 |
| Reaction Conditions | | | | |
| Preheat Temperature, C.$^{(1)}$ | — | 87 | 90 | 90 |
| Temp. Profile, C.$^{(2)}$ | | | | |
| T1 | 250 | 167 | 146 | 133 |
| T2 | 252 | 224 | 150 | 155 |
| T3 | 250 | 252 | 237 | 213 |
| T4 | 251 | 255 | 235 | 215 |
| T5 | 25 | 66 | 51 | 51 |
| Reactor Pressure, atm | 54 | 68 | 37 | 35 |
| Nominal Residence Time, min$^{(3)}$ | 30 | 13 | 9 | 9 |
| Slurry Concentration, wt. %$^{(4)}$ | 2.2 | 4.9 | 9.0 | 9.0 |
| Pump Rate, kg/hr | 12.8 | 29.0 | 43.8 | 43.8 |
| Product Characteristics | | | | |
| Composition, moles | | | | |
| Ba | 0.950 | 0.999 | 1.021 | 1.021 |
| Ti | 1.000 | 0.810 | 0.807 | 0.807 |
| Zr | 0.000 | 0.190 | 0.193 | 0.193 |
| Particle Size, μm$^{(5)}$ | <0.05 | <0.1 | 0.5–1.0 | 0.5–1.0 |
| Surface Area, m$^2$/g | n/a | n/a | n/a | n/a |
| Crystal Phases$^{(6)}$ | BT + BC | BTZ | n/a | BTZ |
| Crystallite Size, Å$^{(7)}$ | n/a | 400 ± 50 | n/a | 540± |
| Effluent | | | | |
| Ba, mg/l | 70.9 | 53.5 | 354 | 457 |
| Na, mg/l | n/a | n/a | 5,910 | 6,150 |

Footnotes:
$^{(1)}$Reactor feed was preheated in a recirculating stirred mix tank at the reported temperature.
$^{(2)}$Temperature profile along the continuous hydrothermal reactor tube. Temperature measurements reported at distance from the inlet: T1 = 45 cm; T2 = 120 cm; T3 = 180 cm; T4 = 270 cm; T5 = 390 cm.
$^{(3)}$Nominal residence time is calculated based on flow of water at room temperature. Actual residence time is shorter depending on density at the reaction temperature.
$^{(4)}$Slurry concentration is based on weight percent of product powder.
$^{(5)}$Particle size was estimated by SEM.
$^{(6)}$Crystalline phases were determined by XRD; phases comprising at least 1 percent of product are reported, major phase first. BT = Barium Titanate; BC = Barium Carbonate; BTZ = solid solution of Barium Titanate and Barium Zirconate.
$^{(7)}$crystalline size estimated by line broadening in XRD analysis.

EXAMPLE 3

Figure 2A:
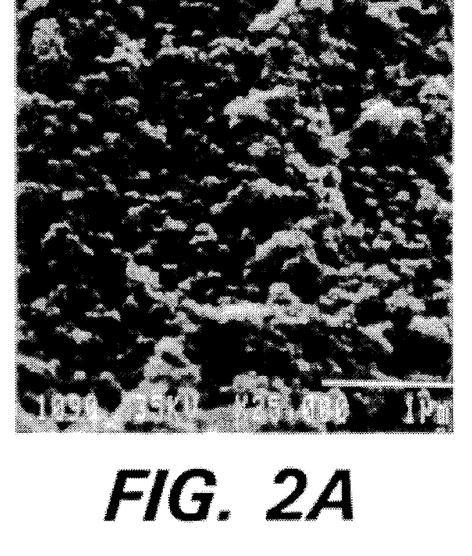
FIGS. 2A and 2B are electron micrographs that show the feed and product morphology, respectively, of barium zirconate titanate (Zr:Ti=19:81) powders prepared from a 4.9 weight % slurry, prereacted at 87° C., that provided non-nucleated materials. Magnification is ×25,000 and the solid line represents 1 micron. Material is from Example 3.
Figure 2B:
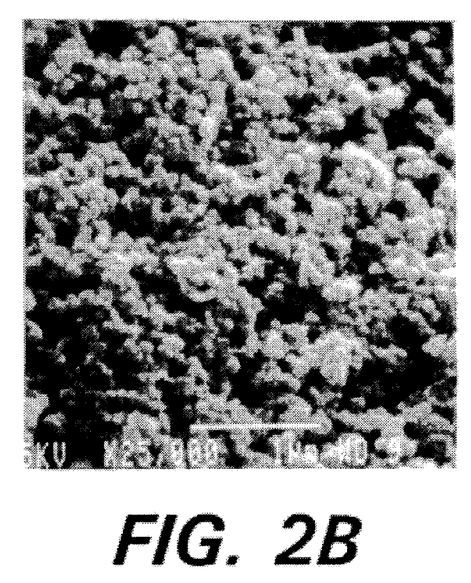

The control of the process has been observed by measuring the particle morphology, degree of crystallinity, and extent of chemical reaction on the feed and product phases of the reaction. FIGS. 2A and 2B are electron micrographs that show the feed and product morphology, respectively, of barium zirconate titanate (Zr:Ti=19:81) powders prepared from non-nucleated materials. The product depicted was prepared using a 4.9 weight percent slurry concentration. The temperature of the pre-reaction tank 20 was held at 87° C. Residence time of the slurry in the 5.08 cm diameter tubular reactor was 13 minutes. See Table I above.

EXAMPLES 4 AND 5

Figure 2C:
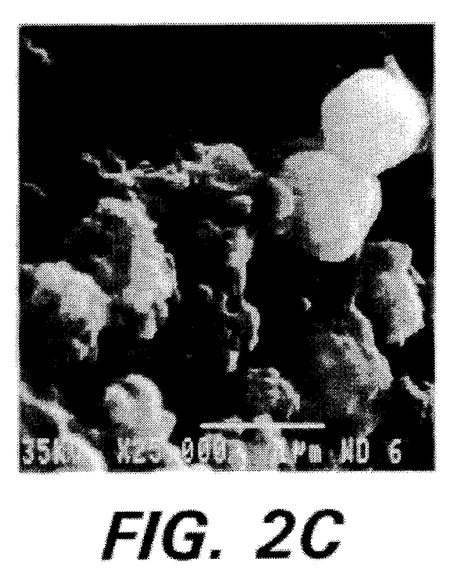
FIGS. 2C and 2D are electron micrographs that show the feed and product morphology, respectively, of barium zirconate titanate (Zr:Ti=19:81) powders prepared from a 9.0 weight % slurry, prereacted at 90° C., that provided nucleated materials. Material is from Example 5. Magnification is ×25,000 and the solid line represents 1 micron.
Figure 2D:
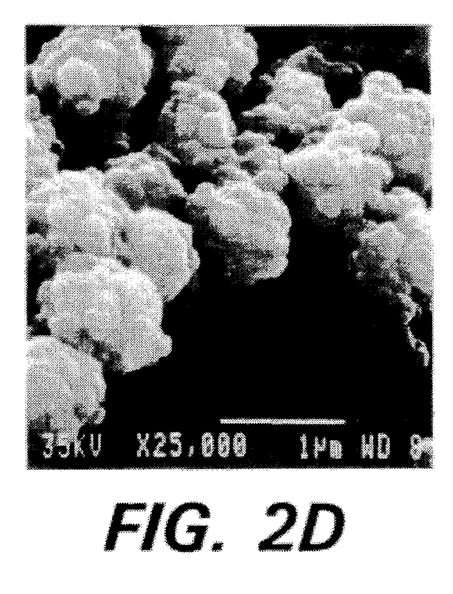
Figure 2E:
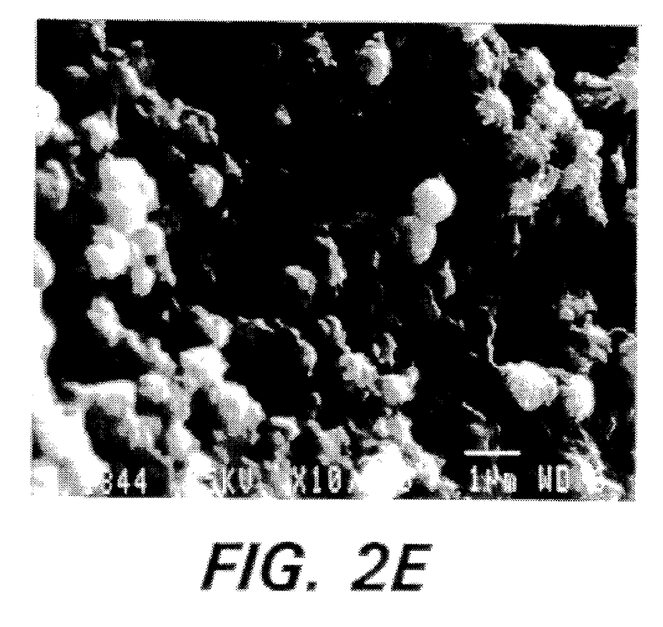
FIGS. 2E and 2F are electron micrographs that show an expanded view of the pre-reacted feed and product phases of the materials in FIGS. 2C and 2D, respectively. Magnification is ×10,000 and the solid line represents 1 micron.
Figure 2F:
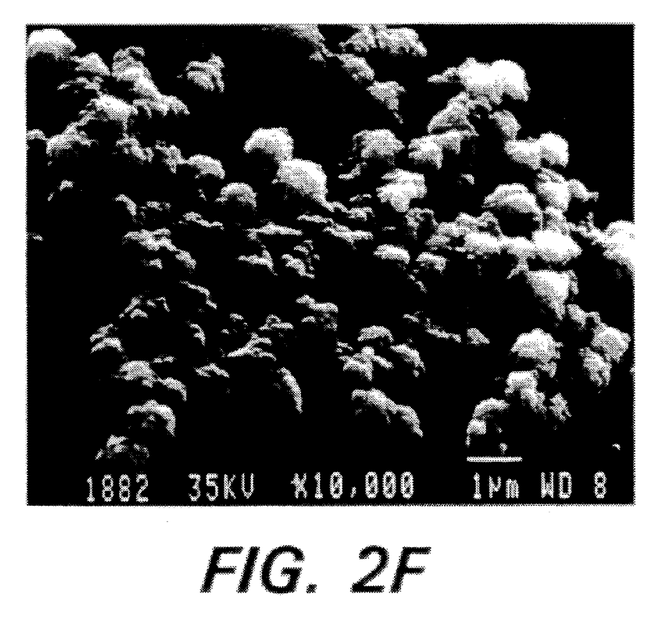

FIGS. 2C and 2D are electron micrographs that show the feed and product morphology, respectively, of barium zirconate titanate (Zr:Ti=19:81) powders prepared from pre-nucleated materials (Example 5). The product depicted employed a 9.0 weight percent slurry. The temperature of the pre-reaction tank 20 was held at 90° C. While the temperature of the tank was 3° C. higher than in the previous example, this difference alone does not account for the different results. Residence time of the slurry in the 5.08 cm diameter tubular reactor was 9 minutes. Note that the spherical agglomerates of partially reacted barium zirconate titanate were formed in the feed material sampled from the pre-reaction tank. An expanded view of the nucleated feed and product phases of the materials in FIGS. 2C and 2D, respectively are shown in FIGS. 2E and 2F. It is noted that FIGS. 2C and 2D show the individual crystallites in the agglomerated particles while FIGS. 2E and 2F show the size uniformity of the product.

Figure 3A:
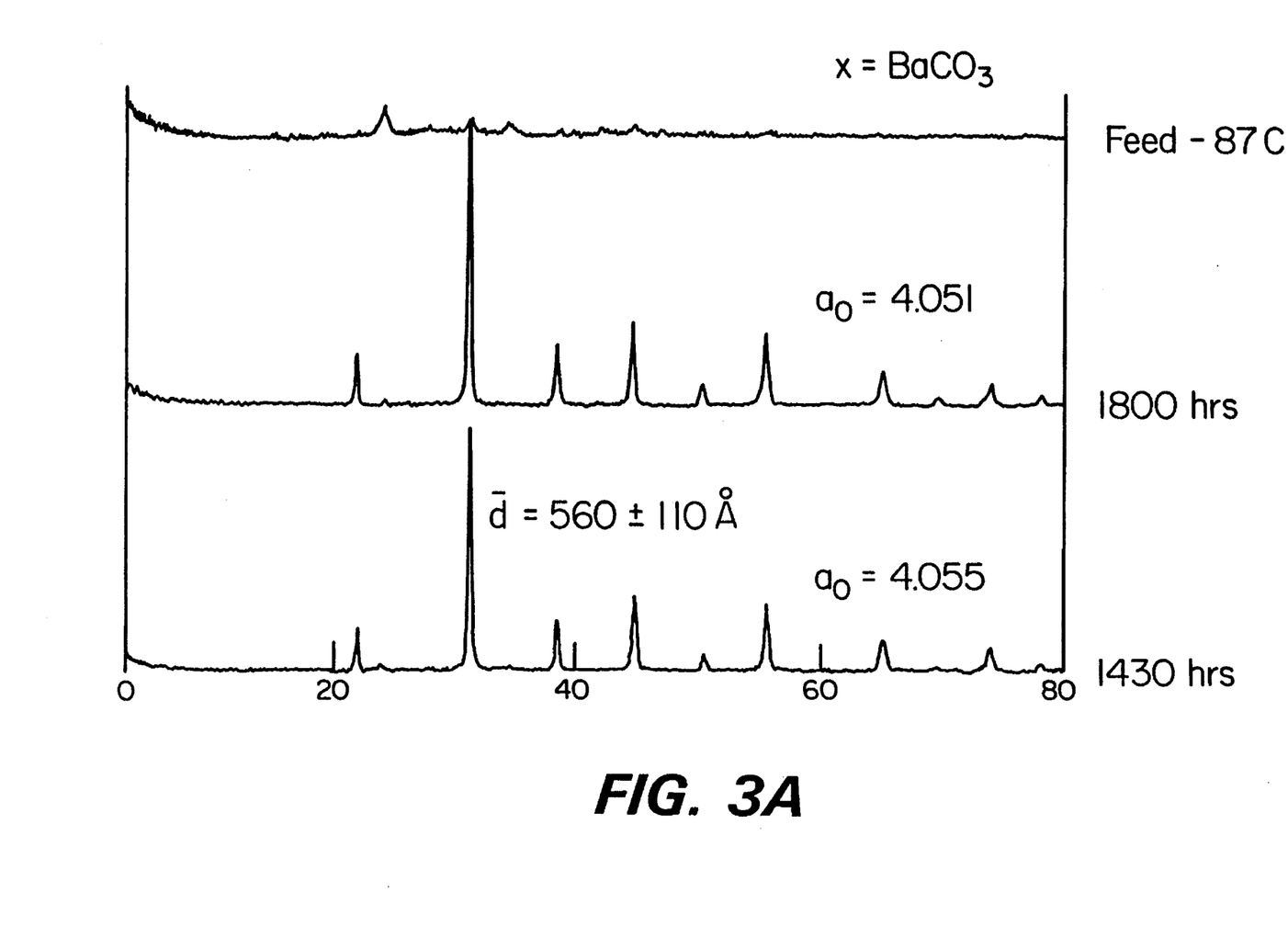
FIG. 3A shows the X-ray diffraction patterns of feed (A) and reaction products (B) produced in FIGS. 2A and 2B, respectively.
Figure 3B:
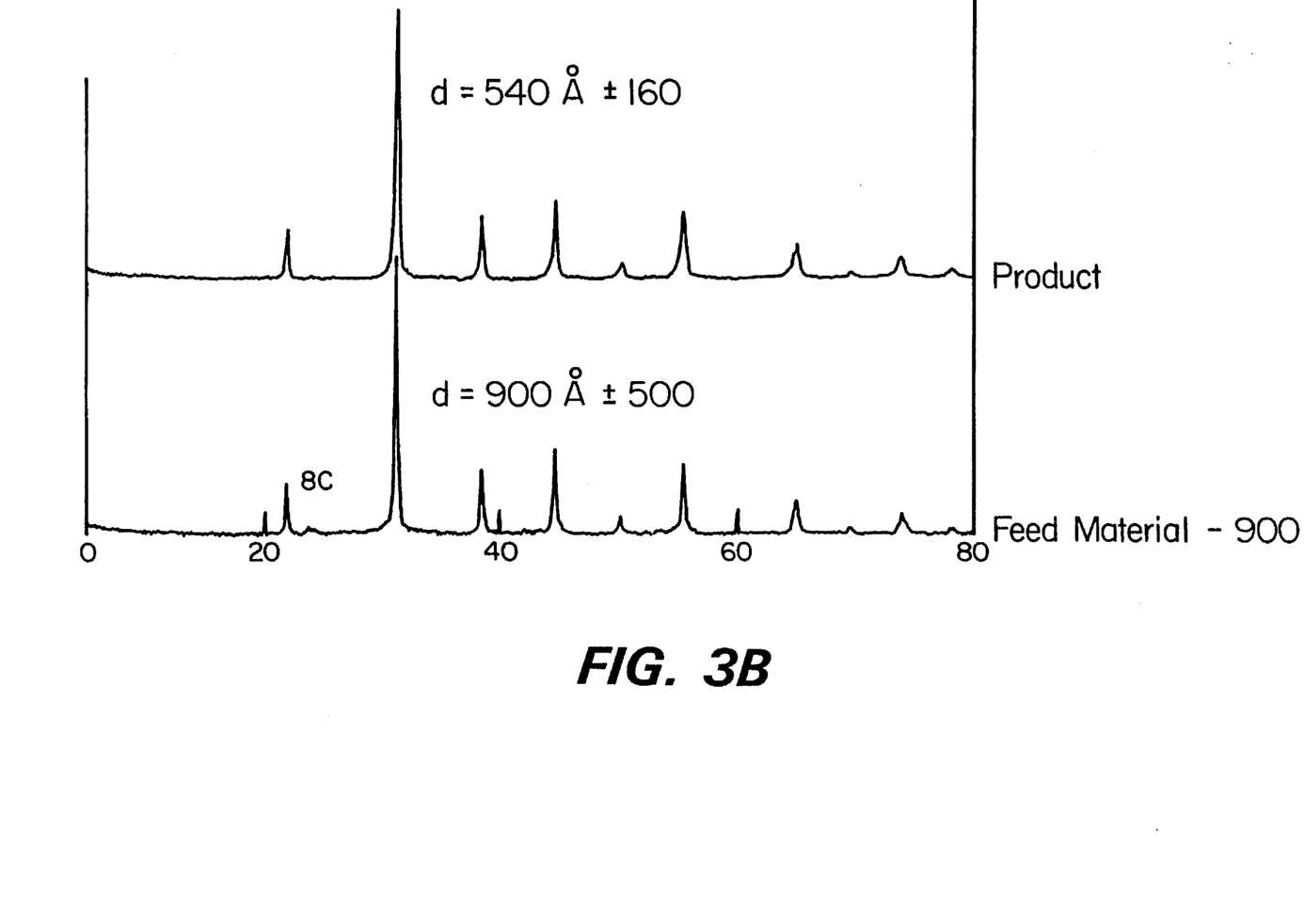
FIG. 3B shows the X-ray diffraction patterns of feed (A) and reaction products (B) produced in FIGS. 2C and 2D, respectively.

FIGS. 3A and 3B show the X-ray diffraction patterns of feed and reaction products produced in the two runs described above. FIG. 3A shows the X-ray diffraction patterns of non-nucleated feed material (A) and reaction product (B) after 2 hours of rector operation, and reaction product (C) after 5.5 hours of reactor operation produced from non-nucleated materials. The feed material (A) prepared at 4.9 weight percent is amorphous except for a small amount of barium carbonate. Product (B) is crystalline barium zirconate titanate with an estimated crystallite diameter of 560+/− 110Å and a lattice parameter $a_o$, of 4.055Å while product (C), produced later in the same test run, has a lattice parameter $a_o$, of 4.051Å. This indicates that little change occurred in the product phase, even after several hours of reactor operation. The products of the reaction are phase pure barium zirconate titanate with the crystallite size nearly equal to the particle size.

In contrast, FIG. 3B shows the X-ray diffraction patterns of feed (A) and reaction product (B) for those shown in FIGS. 2C and 2D, respectively. Here, the feed material at 9.0 weight percent has a high content of crystalline barium zirconate titanate with an estimated crystallite diameter of 900+/−500Å. The feed material also contained approximately 6,000 mg/l of unreacted barium ion and may have some amorphous titanium/zirconium hydrous oxide. The products of the reaction were phase pure barium zirconate titanate with a particle size of 0.5 micron to 1.0 micron and crystallite sizes of 540+/−160Å. In comparison, the crystallite size is nearly equal to the particle size in the non-nucleated case, but is less than 1/10oth the particle size in the nucleated case. See Table I above.

A measure of what is occurring in the various steps is to determine barium consumption, as measured by unreacted barium in the feed and product slurries. The filtrates or centrates were analyzed by inductively coupled plasma analysis to determine concentrations of unreacted components. The results are shown in Table II. At the higher solids loading, a 50 percent decrease in unreacted barium was observed in the pre-reaction tank 20. This again confirms the concentration dependence of the nucleation reaction. Little additional reaction occurred in the pre-reaction tank 20, at either low or high solids loading, even when the reaction was allowed to proceed for three to four hours.

TABLE II

UNREACTED BARIUM IN THE SLURRY, FEED, AND PRODUCT

|  | 4.9% Solids | 9.0% Solids |
|---|---|---|
| Total Ba in Slurry | 12,000 ppm | 20,000 ppm |
| Unreacted Ba in Feed (90° C.) | 12,000 ppm* | 6,340 ppm** |
| Unreacted Ba in Product | 53.5 ppm | 354 ppm |

*87° C.
**90° C.

The final barium concentration is less than 500 ppm for both low and high slurry concentrations (non-nucleated and nucleated cases), suggesting nearly 100 percent reaction to barium zirconate titanate.

Figure 4:
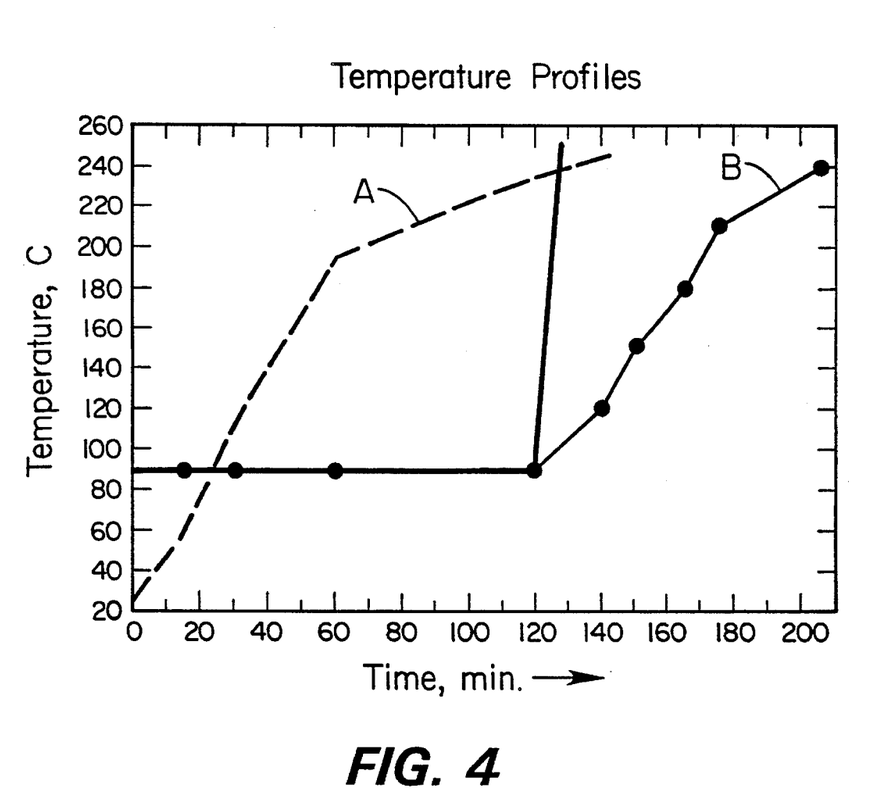
FIG. 4 shows temperature profiles of batch hydrothermal experiments (with and without a pre-reaction step) compared to the temperature profiles of a continuous hydrothermal experiment (including a pre-reaction step).

FIG. 4 shows temperature profiles of batch hydrothermal experiments (without a pre-reaction step, curve A with dashed lines; and with a pre-reaction step, curve B with solid circles). These are compared to the temperature profile of a continuous hydrothermal experiment (including a pre-reaction step, curve C with a solid line). This confirms that the invention allows most of the reaction time to be concentrated in the low pressure, low temperature pre-reaction step while only a small amount of the process time is required in the high temperature, high pressure hydrothermal step. Thus efficiency is increased.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A continuous process for making a crystalline ceramic powder having a perovskite structure, $ABO_3$, comprising:

(a) preparing a first acidic aqueous solution containing one or more elements that are insoluble precursor elements capable of forming the perovskite structure;

(b) preparing a second basic aqueous solution containing a sufficient concentration of hydroxide to precipitate the elements selected in step (a);

(c) mixing the first acidic solution with the second basic solution to precipitate a substantially pure mixture of hydroxides;

(d) washing the precipitate to remove hydroxide and salt impurities;

(e) forming an aqueous slurry of soluble oxides or hydroxides of one or more soluble precursor elements capable of forming the perovskite structure, and heating the slurry to a temperature sufficient to dissolve the soluble oxides or hydroxides of the soluble precursor elements;

(f) redispersing the washed precipitate of step (d) with water and heating to the temperature of the soluble oxides or hydroxides of step (e);

(g) mixing solubilized oxides or hydroxides of step (e) with the heated slurry of step (f);

(h) pre-reacting the mixed slurry of step (g) at a temperature, pressure, concentration, and for a time necessary to control powder morphology obtained in step (i); and (i) hydrothermally treating the pre-reacted slurry in a continuous reactor at an elevated temperature and pressure for a time sufficient to form the powder.

2. The process according to claim 1, wherein the powder is separated, washed, and dried.

3. The process according to claim 1, wherein the heating in step (e) is at a temperature between about room temperature to about 70° C.

4. The process according to claim 3, wherein the heating in step (e) is at a temperature between about 50° C. to about 70° C.

5. The process according to claim 1, wherein the pre-reacting step (h) is at a temperature above about 70° C.

6. The process according to claim 5, wherein the pre-reacting step (h) is at a temperature between about 70° C. and 90° C.

7. The process according to claim 1, wherein the temperature for the hydrothermal treating step (i) is between about 210° C. and 240° C., and the pressure is between about 350 psi to about 510 psi.

8. The process according to claim 7, wherein the time for treatment of the pre-reacted solution within the continuous reactor of step (i) is less than 30 minutes.

9. The process according to claim 7, wherein the time for treatment of the pre-reacted solution within the continuous reactor of step (i) is less than 15 minutes.

10. The process according to claim 1, wherein the insoluble precursor element comprises titanium and the soluble precursor element comprises barium.

11. The process according to claim 10, wherein the temperature for the hydrothermal treating step (i) is between about 210° C. and 240° C., and the pressure is between about 350 psi to about 510 psi.

12. The process of claim 1, further comprising: prereacting the slurry in step (h) to obtain a powder having a particle size between about 0.05 to about 1.0 microns.

13. A continuous-process for making a crystalline ceramic powder having a perovskite structure, $ABO_3$, comprising:

(a) preparing a first acidic aqueous solution containing one or more elements that are insoluble precursor elements capable of forming the perovskite structure, wherein an insoluble precursor element comprises titanium and dopants are selected from the group consisting of hafnium, zirconium, niobium, tantalum, uranium, iron, antimony, lanthanum, bismuth, thorium, indium, nickel, manganese, neodymium, samarium, cobalt, tungsten, tin, vanadium, dysprosium, praseodymium, yttrium, promethium, europium, cerium, ytterbium, lutetium, scandium, gadolinium, terbium, holmium, erbium, thulium, chromium, potassium, and lithium;;

(b) preparing a second basic solution containing a sufficient concentration of hydroxide to precipitate the elements selected in step (a);

(c) mixing the first acidic solution with the second basic solution to precipitate a substantially pure mixture of hydroxides;

(d) washing the precipitate to remove hydroxide and salt impurities;

(e) forming a slurry of oxides or hydroxides of one or more elements that are soluble precursor elements capable of forming the perovskite structure, and heating the slurry to a temperature sufficient to dissolve the soluble oxides or hydroxides of the soluble precursor elements, wherein when a soluble precursor oxide or hydroxide of barium is used the temperature is between about 50° C. to about 70° C.;

(f) redispersing the washed precipitate and heating to the temperature of the soluble oxides or hydroxides of step (e);

(g) mixing the redispersed slurry of step (f);

(h) pre-reacting the mixed and redispersed slurry at a temperature between about 70° C. and 90° C., at atmospheric pressure, and at a concentration, and for a time necessary to control powder morphology in step (i); and (i) hydrothermally treating the pre-reacted slurry in a continuous reactor at a temperature between about 210° C. and 240° C., at a pressure between about 350 psi to about 510 psi for a time sufficient to form the powder.

14. The process according to claim 13, wherein the powder is separated, washed, and dried.

15. The process according to claim 13, wherein the time for treatment of the pre-reacted solution within the continuous reactor of step (i) is less than 30 minutes.

16. The process according to claim 13, wherein residence time for treatment of the pre-reacted solution within the continuous reactor of step (i) is less than 15 minutes.

17. The process of claim 13, further comprising: prereacting the slurry in step (h) to obtain a powder having a particle size between about 0.05 to about 1.0 microns.

18. A continuous process for making crystalline ceramic particles having a perovskite structure, $ABO_3$, comprising:

(a) preparing a first acidic solution containing one or more elements selected from the group consisting of hafnium, zirconium, titanium, niobium, tantalum, uranium, iron, antimony, lanthanum, bismuth, thorium, indium, nickel, manganese, neodymium, samarium, cobalt, tungsten, tin, vanadium, dysprosium, praseodymium, yttrium, promethium, europium, cerium, ytterbium, lutetium, scandium, gadolinium, terbium, holmium, erbium, thulium, chromium, potassium, and lithium;

(b) preparing a second basic solution containing a sufficient concentration of hydroxide to precipitate the elements selected in step (a) when mixed with the first solution;

(c) adding the first acidic solution to the second basic solution to precipitate a substantially pure mixture of hydroxides;

(d) washing the precipitate to remove hydroxide and salt impurities that solubilize lead or other constituent elements of the particles;

(e) preparing an aqueous slurry of the washed precipitate and adding oxides or hydroxides of one or more of the elements selected from the group consisting of barium, strontium, calcium, magnesium, lead, zinc, yttrium, manganese, cobalt, and nickel;

(f) mixing and heating the aqueous slurry of step (e) at a temperature where the washed precipitate from step (d) does not convert to an oxide, yet is sufficient to dissolve the oxides or hydroxides of elements selected in step (e);

(g) pre-reacting the mixed and heated slurry of step (f) at a temperature, pressure, concentration, and for a time sufficient to produce a selected particle morphology; and (h) hydrothermally treating the slurry of step (g) in a continuous reactor at an elevated temperature and pressure for a time sufficient to form the particles.

19. The process according to claim 18, comprising the additional step of:

(i) cooling the hydrothermally treated slurry containing the particles, separating the particles, washing with purified water and drying.

20. The process according to claim 18, wherein the heating in step (f) is at a temperature between about room temperature to about 70° C.

21. The process according to claim 20, wherein the heating in step (f) is at a temperature between about 50° C. to about 70° C.

22. The process according to claim 18, wherein the pre-reacting step (g) is at a temperature above about 70° C.

23. The process according to claim 18, wherein the pre-reacting step (g) is at a temperature between about 70° C. and 90° C.

24. The process according to claim 18, wherein the temperature for the hydrothermal treating step (h) is between about 210° C. and 240° C., and the pressure is between about psi to about 600 psi.

25. The process according to claim 24, wherein the time for treatment of the pre-reacted solution within the continuous reactor of step (h) is less than 30 minutes.

26. The process according to claim 24, wherein the time for treatment of the pre-reacted solution within the continuous reactor of step (h) is less than 15 minutes.

27. The process according to claim 18, wherein a selected element in the acidic solution of step (a) comprises titanium and an oxide or hydroxide of barium is added in step (e).

28. The process according to claim 18, wherein the hydroxide of step (b) is selected from the group consisting of sodium hydroxide, ammonium hydroxide, and potassium hydroxide, with the proviso that when manganese, nickel, or cobalt are selected in step (a) ammonium hydroxide is not selected.

29. The process according to claim 18 wherein in step (c) the first acidic solution is added to the second basic solution to form a precipitate at a pH ranging from about 4 to about 12.

30. The process according to claim 18 wherein in step (e) the oxides or hydroxides are added to the aqueous slurry of the washed precipitate at a pH ranging from about 10 to about 13.

31. The process of claim 18, further comprising: prereacting the slurry in step (g) to obtain a powder having a particle size between about 0.05 to about 1.0 microns.

32. A process for making a crystalline ceramic powder having a perovskite structure, $ABO_3$, comprising:

(a) dissolving one or more acidic salts of elements selected from the group consisting of hafnium, zirconium, titanium, niobium, tantalum, uranium, iron, antimony, lanthanum, bismuth, thorium, indium, nickel, manganese, neodymium, samarium, cobalt, tungsten, and tin, vanadium, dysprosium, praseodymium, yttrium, promethium, europium, cerium, ytterbium, lutetium, scandium, gadolinium, terbium, holmium, erbium, thulium, chromium, potassium, and lithium in an aqueous solution to form an acidic solution, wherein the acidic solution comprises the selected elements in a stoichiometry equal to step (g) stoichiometry;

(b) slowly adding the solution of step (a) to a vigorously mixed basic solution containing hydroxides of sodium, ammonium, and potassium wherein ammonium is not used when manganese, nickel, or cobalt are selected as an ingredient in step (a), until a pH value between 4 and 12 is reached in a range where all elements are essentially precipitated as hydroxides; and where an equal or narrower pH range is selected which will provide incorporation of elements added in step (d);

(c) separating the precipitate from the solution and washing with purified water;

(d) redispersing the washed precipitate in water and mixing with the oxides or hydroxides of one or more of the elements selected from the group consisting of barium, strontium, calcium, magnesium, lead, zinc, yttrium, manganese, cobalt, and nickel in the proper ratio to obtain a mixture, wherein the mixture comprises the selected oxides or hydroxides in a stoichiometry equal to step (g) stoichiometry, whereby a homogeneous slurry is produced;

(e) mixing and heating the aqueous slurry of step (d) at a temperature where the washed precipitate from step (c) does not convert to an oxide, yet is sufficient to dissolve the oxide or hydroxide of elements selected in step (d);

(f) pre-reacting the mixed and heated slurry of step (e) at a temperature, pressure, concentration, and for a time sufficient to produce a selected powder morphology; and (g) hydrothermally treating the slurry in a continuous reactor at a temperature, at a pressure, and for time sufficient to form the crystalline ceramic powder having a perovskite structure.

33. The process of claim 32, further comprising: prereacting the slurry in step (f) to obtain a powder having a particle size between about 0.05 to about 1.0 microns.

* * * * *